United States Patent [19]

Rabe et al.

[11] Patent Number: 4,942,803
[45] Date of Patent: Jul. 24, 1990

[54] STEERING GEAR WITH PRESSURE-BALANCED VALVE

[75] Inventors: William T. Rabe, Lafayette, Ind.; Wendell L. Gilbert, Lebanon, Tenn.

[73] Assignee: TRW Inc., Lyndhurst, Ohio

[21] Appl. No.: 316,472

[22] Filed: Feb. 27, 1989

Related U.S. Application Data

[62] Division of Ser. No. 73,711, Jul. 15, 1987, Pat. No. 4,872,393.

[51] Int. Cl.$^5$ .............................. B62D 5/083
[52] U.S. Cl. .................... 91/370; 91/375 A; 137/625.24
[58] Field of Search ............... 91/375 R, 375 A, 399; 137/625.23, 625.24

[56] References Cited

U.S. PATENT DOCUMENTS

| 3,461,779 | 8/1969 | Jablonsky | 91/372 |
| 3,606,819 | 9/1971 | Venable et al. | 91/375 A |
| 4,028,998 | 6/1977 | Jablonsky | 91/375 A |
| 4,296,673 | 10/1981 | Bacardit | 91/375 A |
| 4,438,679 | 3/1984 | Lang et al. | 91/370 |
| 4,459,897 | 7/1984 | Bacardit | 91/375 A |
| 4,625,624 | 12/1986 | Adams | 91/375 A |
| 4,671,747 | 6/1987 | Arbjerg | 91/375 R X |

FOREIGN PATENT DOCUMENTS 2753185  6/1978  Fed. Rep. of Germany ... 91/375 A

Primary Examiner—Robert E. Garrett
Assistant Examiner—George Kapsalas
Attorney, Agent, or Firm—Tarolli, Sundheim & Covell

[57] ABSTRACT

A vehicle steering for turning the steerable wheels of a vehicle having a fluid motor with a housing defining a fluid chamber and a piston in the chamber dividing the chamber into first and second chamber portions. A rotatable steering input member is supported by the housing. A rotatable follow-up member is associated with the piston and rotatable upon movement of the piston in the chamber. A valve controls pressurized fluid flow to the first and second chamber portions. The valve comprises first and second relatively movable valve parts. One of the valve parts is connected with the input member and the other of the valve parts is connected with the follow-up member forming a unit therewith. The unit has a surface against which fluid pressure in the first and second chamber portions acts tending to create an axial force on the unit. Pressure is applied to another surface area of the unit to balance the axial force acting on the unit.

4 Claims, 4 Drawing Sheets

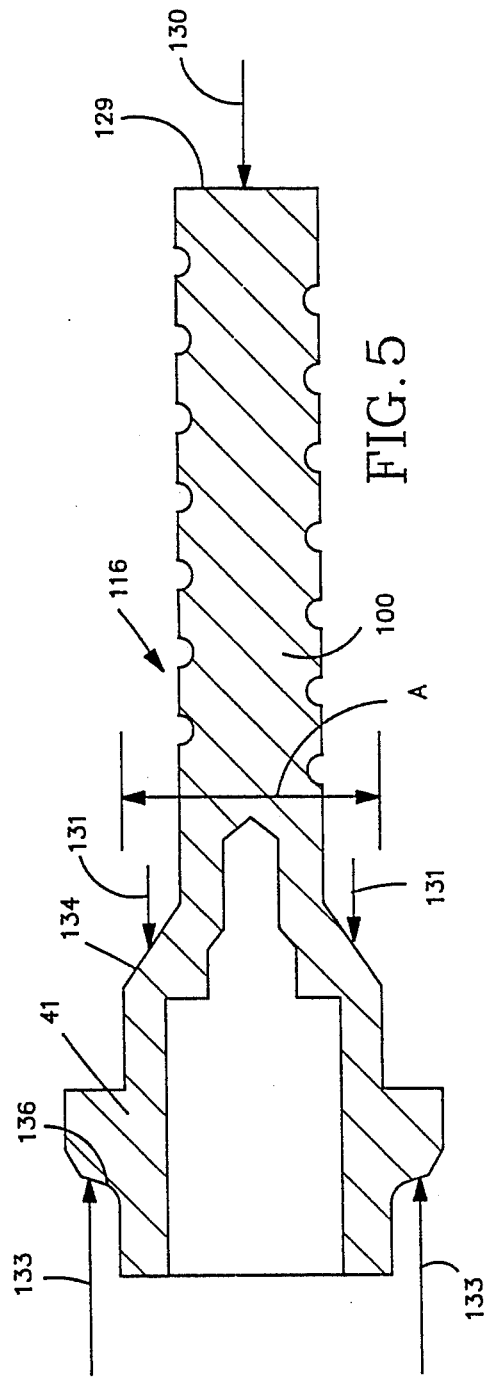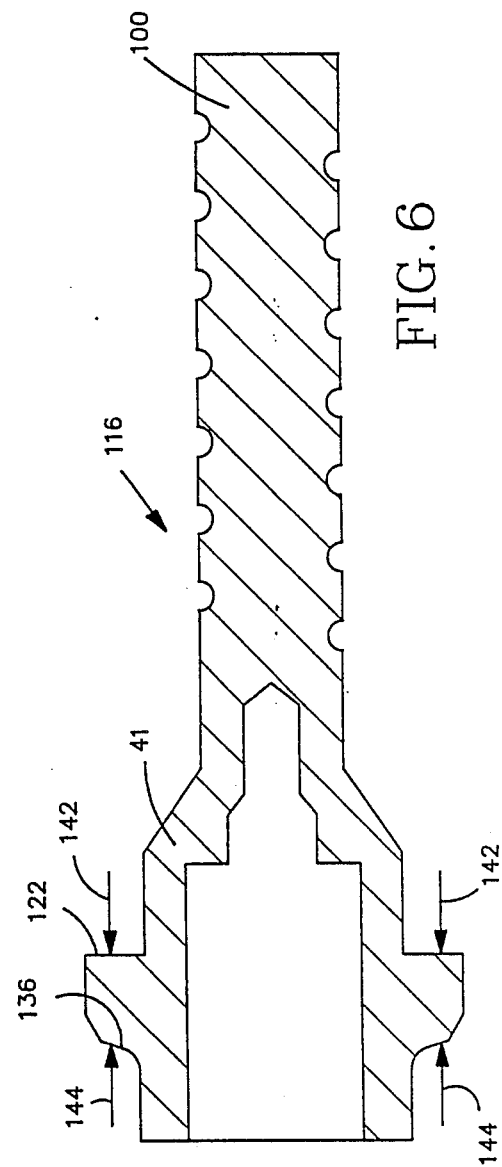

STEERING GEAR WITH PRESSURE-BALANCED VALVE

This is a divisional of copending co-pending application Ser. No. 073,711 filed on July 15, 1987 issued as U.S. Pat. No. 4,872,393 on Oct. 10, 1989,

BACKGROUND OF THE INVENTION

The present invention relates to a pressurized fluid operated mechanism, and in particular, relates to an integral hydraulically assisted steering gear for a vehicle.

A known integral power steering gear includes a housing defining a chamber. A piston is located within the chamber dividing the chamber into first and second chamber portions. The piston has a series of rack teeth formed thereon. The rack teeth mesh with a sector gear which is fixed to an output shaft. The output shaft is connected with a steering linkage connected with the steerable wheels of a vehicle to steer the vehicle when the output shaft rotates.

The housing further includes a fluid inlet port and a fluid outlet port. The inlet port is connected with the discharge passage of a hydraulic pump. The outlet port is connected with a return passage of the pump. A valve assembly including a pair of relatively rotatable valve elements is supported by the housing. The valve assembly controls the flow of pressurized fluid between the pump and one or the other of the first and second chambers. The valve assembly controls the direction and amount of steering. Pressurized fluid moves the piston and thereby rotates the output shaft. One of the valve elements is connected to a manually rotatable input shaft which is rotated by the manually operated steering wheel. The other of the valve members is connected with a follow-up member which rotates in response to movement of the piston.

Typically the follow-up member is a ball screw drive comprising a worm disposed in an axial bore formed in the piston. The worm and the bore in the piston are helically grooved to receive a plurality of balls therebetween. The grooves cooperate with balls to rotate the worm upon axial movement of the piston. Thus, the valve part connected with the follow-up member will rotate. In the event of a loss of fluid pressure, the follow-up member is rotated directly by the input shaft because of a mechanical connection between the input shaft and the follow-up member. Manual rotation of the follow-up member causes the balls to move the piston axially which rotates the output shaft to effect manual steering of the vehicle.

The known mechanism typically also includes a check valve located in the housing. The check valve allows circulation of fluid between the first and second chambers when the piston is moved manually such as during a steering maneuver occurring during a loss of fluid pressure. The location of the check valve in the housing has resulted in complications in manufacturing of the steering gear.

The fluid pressure which causes axial movement of the piston also results in a net axial load being applied to the follow-up member and/or valve member connected with the follow-up member. This occurs because the follow-up member is typically disposed within one of the chambers. Thus, the net axial load is transmitted to bearings which support the follow-up member and to the valve member connected with the follow-up member.

SUMMARY OF THE INVENTION

The present invention is directed to an improved hydraulically assisted steering gear for automotive vehicles. The steering gear embodying the present invention includes a housing with a surface defining a chamber. A piston is movable within the chamber and divides the chamber into first and second chamber portions. A directional control valve assembly controls fluid flow to and from the first and second chamber portions. The directional control valve assembly includes a pair of relatively rotatable valve parts. A first one of the valve parts is connected with an input member which rotates with the manually operated steering wheel of the vehicle. A second one of the valve parts is connected with a follow-up member. When the first valve part rotates relative to the second valve part from an initial position, the valve assembly is actuated and fluid flow is permitted from a pump to one chamber portion and the force generated thereby acts to move the piston. The follow-up member is driven to rotate in response to axial movement of the piston. The follow-up member in turn rotates the second valve part to return to the initial position relative to the first valve member to deactuate the valve assembly.

The follow-up member and second valve part have certain surface areas against which fluid pressure in the first and second chamber portions acts thereby creating an axial force on the second valve part and follow-up member. Fluid pressure is applied to another surface area of the second valve part and follow-up member to balance the axial force applied by the fluid pressure in the first and second chambers. Thus, the fluid pressure forces are balanced and thus no net axial load results.

Further, the steering gear of the present invention includes a simple and effective valve for allowing fluid to flow between the first and second chamber portions when the piston is moved manually. The valve includes conduits for circulating the fluid between the chamber portions in the event of a fluid pressure loss and a ball located in a passage in one of the valve parts.

BRIEF DESCRIPTION OF THE DRAWINGS

Further features and advantages of the present invention will be apparent to those skilled in the art to which the present invention relates from reading the following description of a preferred embodiment with reference to the accompanying drawings, in which:

FIGS. 5 and 6 are schematic views of a part of the power steering gear of FIG. 1 showing forces acting on the part during different modes of operation of the steering gear.

DESCRIPTION OF A PREFERRED EMBODIMENT

Figure 1:
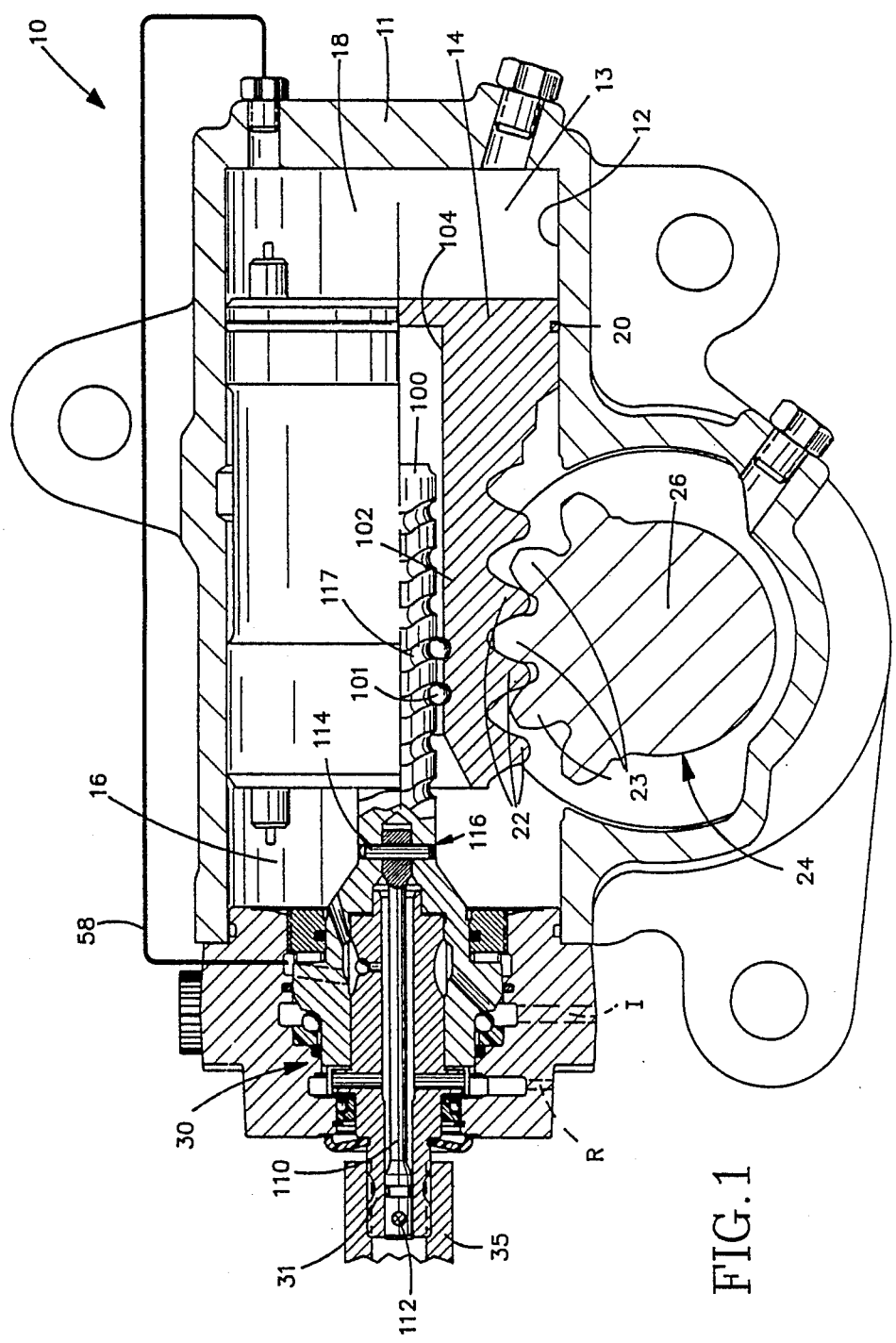
FIG. 1 is a longitudinal cross-sectional view of a power steering gear embodying the present invention.

The present invention is applicable to fluid operated servo mechanisms of a variety of constructions and uses. Preferably, the present invention is embodied in a power steering gear 10 (FIG. 1) for turning the dirigible wheels of a vehicle to effect steering of the vehicle. The power steering gear 10 includes a housing 11 having an inner cylindrical surface 12 defining a chamber 13. A piston 14 divides the chamber 13 into opposite chamber portions 16 and 18 located at opposite ends of the piston 14. An 0-ring 20 carried in a groove in the piston 14 provides a fluid seal between the chamber portions 16 and 18.

A series of rack teeth 22 are formed on the periphery of the piston 14. The rack teeth 22 mesh with teeth 23 formed on a sector gear 24. The sector gear 24 is fixed on an output shaft 26 which extends outwardly from the steering gear 10 through an opening in the housing 11. The output shaft 26 is typically connected to a pitman arm (not shown), which in turn is connected to the mechanical steering linkage of the vehicle. Thus, as the piston 14 moves in the chamber 13, the output shaft 26 is rotated to operate the steering linkage as will be understood by those skilled in the art.

The housing 11 includes a fluid inlet port I and a fluid return port R. The inlet port I and return port R are adapted to be connected in fluid communication with hydraulic circuitry including a power steering pump (not shown). Pressurized fluid is directed from the inlet port I to one or the other of the chamber portions 16 and 18 by a directional control valve assembly 30. Fluid from the other of the chamber portions 16 and 18 is simultaneously directed by the directional control valve assembly 30 to the return port R which is connected with the power steering pump fluid reservoir. The valve assembly 30 is actuated by a manually rotatable shaft 31. The shaft 31 is supported for rotation relative to the housing 11. An outer end portion 33 of the shaft 31 is splined for receiving a portion of a shaft 35 hereon. The shaft 35 is connected with a steering wheel which is manually turned by the operator of the vehicle to effect steering of the vehicle.

The valve assembly 30 (FIG. 2) includes a valve core part 40 and a valve sleeve part 41. The valve core part 40 is located coaxially within the valve sleeve part 41. The valve core part 40 is supported for relative rotation by the valve sleeve part 41. The valve sleeve part 41 (FIG. 3) has three radially directed passages 50 extending from its outer circumference to its inner circumference. The passages 50 are spaced 120° apart about the valve sleeve part 41. The passages 50 communicate with an annulus 51 (FIG. 2) in the housing 11. The annulus 51 in turn is connected with the inlet port I and is thus subjected to the fluid pressure.

Figure 3:
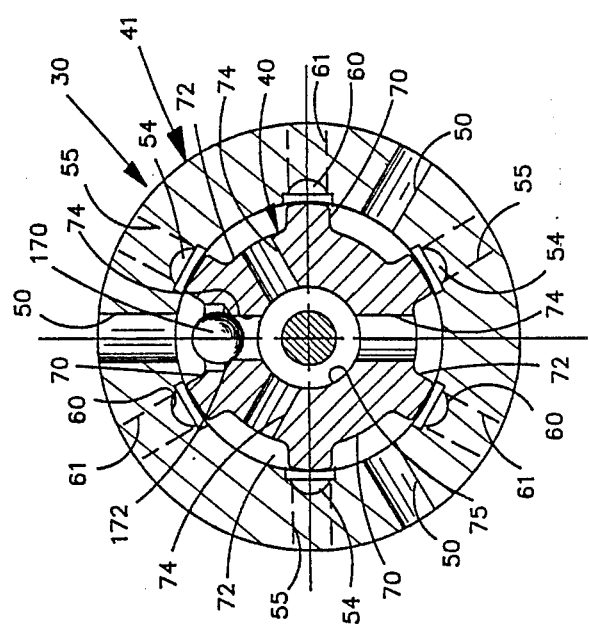
FIG. 3 is a cross-sectional view taken approximately along line 3—3 of FIG. 2.

The valve sleeve part 41 has on its inner surface three axially extending grooves 54 (FIG. 3). The three grooves 54 are equally spaced around the inner surface of the valve sleeve part 41. Each of the grooves 54 communicate with a respective radially extending passage 55. The passages 55 communicate with an annulus 56 in the housing 11. The annulus 56 communicates with a suitable housing passage 58, which in turn communicates with the chamber portion 18. The valve sleeve part 41 further includes three axially extending grooves 60 on the inner surface thereof. The grooves 60 are equally spaced around the inner surface of the valve sleeve part 41. Each of the grooves 60 communicate with a respective passage 61 which extends through the valve sleeve part 41 and communicates with the chamber portion 16.

The valve core part 40 has an elongated cylindrical configuration and is integrally formed as one-piece with the shaft 31. The valve core part 40 has a plurality of axially extending grooves in its outer circumference. Three grooves 70 are spaced 120° apart about the outer circumference of the valve core part 40 and communicate with the passages 50 in the valve sleeve part 41. The extent of the grooves 70 around the outer circumference of the valve core part 40 of the groove 70 is such that each of the grooves communicates equally with respective slots 54 and 60 when the core part 40 is in a centered or a neutral position relative to the valve sleeve part 41. Also equally spaced about the outer circumference of valve core part 40 and located intermediate the grooves 70 are the axially extending grooves 72. Each of the grooves 72 communicate with a respective passage 74 which extends from each groove 72 into an internal passage 75 of the valve core part 40. The internal passage 75 of the valve core part 40 also communicates with four radially directed passages 78 (FIG. 2) extending through the valve core part. The radially directed passages 78 communicate with an annulus 80 in the housing 11. The annulus 80 in turn communicates with the return port R in the housing 11.

When the valve parts 40, 41 are in the neutral position, the fluid pressure in annulus 51 is communicated through the passages 50 and into the grooves 70. The grooves 70 communicate equally with the passages 55 and 61. Thus, equal fluid pressure is delivered into the chamber portions 16 and 18 and the piston 14 does not move.

If the valve core part 40 is rotated clockwise relative to the valve sleeve part 41 from the position viewed in FIG. 3, the grooves 60 are blocked from communicating with the inlet passages 50. The grooves 54 are simultaneously placed in greater fluid communication with the inlet passages 50. Thus, fluid flows from the grooves 54 through passages 55 and into the annulus 56 in the housing 11. The fluid flows from the annulus 56 through passage 58 to the cylinder chamber portion 18. Fluid from the cylinder chamber portion 16 vents by flowing through the passages 61 into the groove 60 in the inner surface of the valve sleeve part 41. The fluid flows from the grooves 60 of the valve sleeve part 41 into the grooves 72 in the valve core part 40. The fluid then flows from the grooves 72 through passages 74 into the internal passage 75 of the valve core part 40. The fluid is conducted through the internal passage 75, through the passages 78 and into the annulus 80 which is connected with the return port R in the housing 11. Pressurizing the chamber portion 18 and venting the chamber portion 16 thus causes the piston 14 to move to the left, as viewed in FIG. 1.

If the valve core part 40 is rotated in a counterclockwise direction relative to the valve sleeve part 41 from the position of FIG. 3, the inlet pressure in passages 50 communicates with the grooves 60 in the inner surface of the valve sleeve part 41 and through the passages 61 into the chamber portion 16. The fluid from the chamber portion 18 vents through the passage 58, annulus 56, passages 55, grooves 54 in the inner surface of the valve sleeve part 41, grooves 72 in the outer surface of the valve core part 40, passages 74, 75 and 78 in the valve core part 40 to the annulus 80 which is in communication with the return port R. Pressurizing the chamber portion 16 and venting the chamber portion 18 thus causes the piston 14 to move to the right, as viewed in FIG. 1.

A follow-up member 100 (FIG. 1) has a screw thread portion 117 formed in its outer periphery. A plurality of balls 101 are located in the screw thread portion 117. The balls 101 are also located in an internal threaded portion 102 formed in a bore 104 of the piston 14. Axial movement of the piston 14 causes the follow-up member 100 to rotate as is well known. The valve sleeve part 41 is connected with the follow-up member 100. Thus, the valve sleeve part 41 rotates with the follow-up member 100.

A torsion bar 110 is connected between the input shaft 31 and the follow-up member 100 by pins 112, 114 respectively. Thus, when the valve core part 40 is rotated relative to the valve sleeve part 41 away from the neutral position of FIG. 3, the piston 14 moves axially. When steering is terminated, the follow-up member 100 and the valve sleeve part 41 will rotate relative to valve core part 40 and return the valve parts 40, 41 to the neutral position.

The valve sleeve part 41 and the follow-up member 100 form an integral one-piece unit 116 which is supported for rotation by bearings 118 and 119 (FIG. 2) located between the valve sleeve part and the housing 11. The bearing 118 is located between an annular projecting portion 121 of the valve sleeve part 41 and a radial wall 123 of the housing 11. The bearing 118 is a ball bearing and is subjected to the fluid pressure in the annulus 51. The fluid pressure in the annulus 51 is sealed from escaping therefrom by a seal ring 120 located between the outer surface of the valve sleeve part 41 and the housing 11.

The bearing 119 is a thrust bearing and is located between a radial surface 122 of the annular projecting portion 121 of the valve sleeve part 41 and a retaining nut 124. The nut 124 is threaded into the housing 11 and holds the valve assembly 30 in position in the housing 11. The bearing 119 is subjected to the fluid pressure in the annulus 56. A seal ring 126 prevents the escape of fluid pressure from the annulus 56. The seal ring 126 is located between the nut 124 and an outer surface of the valve sleeve part 41. Thus, the fluid pressure in annulus 56 acts on the surface 122 of the unit 116. Another seal ring 127 is disposed in a groove in the housing 11 to prevent fluid leakage between the annulus 51 and the annulus 56.

The unit 116, which comprises the valve sleeve part 41 and the follow-up member 100, is pressure balanced. When the valve assembly 30 directs fluid pressure into the chamber portion 16, forces, represented by arrows in FIG. 5, act on the unit 116. The total force acting in a direction on the unit 116 is the fluid pressure multiplied by the projected surface area in that direction which is contacted by fluid. Specifically, a force represented by arrow 130, is the fluid pressure acting on an end surface 129 of the follow-up member 100. Also a force, represented by arrows 131, is the fluid pressure acting on the projected surface area in the direction of arrow 131 of a tapered portion 134 of the unit 116 which interconnects the valve sleeve part 41 and the follow-up member 100. The projected area of the surfaces 129, 134 engaged by fluid pressure acting in addition to the left, as viewed in FIG. 5, is indicated by the line designated A which represents a diameter of the total projected surface area. The pressure balancing of the unit 116 is accomplished by having the fluid pressure in annulus 50 act on the surface 136. The projected surface area of surface 136 in the direction of arrow 133 equals the surface area represented by the line A. As a result, the force 133 acting to the right on the unit 116 is balanced against the forces 130, 131 acting to the left. Thus, there is no net axial force acting on the unit 116 loading the bearings 118, 119 which support the unit.

The pressure balancing occurs also when the chamber portion 18 is pressurized to move the piston 14. When the chamber portion 18 is pressurized, fluid pressure in annulus 56 acts on the surface area 122 (FIG. 6) of the valve member 41 as a force represented by the arrows 142. The force 142 is balanced by the fluid pressure in annulus 50 acting on the surface 136 as a force represented by the arrows 144. The projected area of surface 136 equals the area of surface 122, and thus, if the chamber portion 18 is pressurized the forces 142, 144 acting on the unit 116 are balanced so no net axial loading of the unit 116 occurs.

Figure 4:
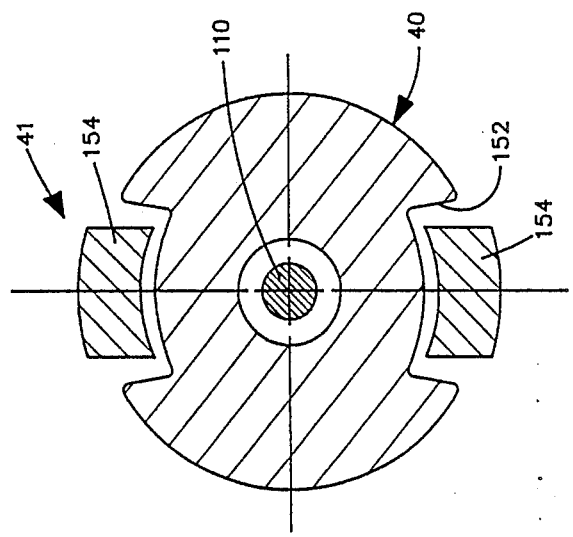
FIG. 4 is a cross-sectional view taken approximately along line 4—4 of FIG. 2.

The steering gear 10 is constructed to provide for manual steering of the vehicle in the event of a loss of fluid pressure. The valve core part 40 has diametrically opposite recesses 152 (FIG. 4) in the outer periphery thereof. Driving lugs 154 project axially from the valve sleeve part 41 into the recesses 152 in the valve core part 40. After some relatively small amount of relative rotation between the valve parts 40, 41, usually no greater than eight degrees, the side surfaces of the recesses 152 will engage the lugs 154 and cause a positive drive between the input shaft 31 and the follow-up member 100. This positive drive will cause rotation of the follow-up member 100 in the direction of rotation of the input shaft 31. Rotation of the follow-up member 100 causes the piston 14 to move axially in the chamber 13 even though there is no fluid pressure acting on the piston. Thus, the piston 14 will move axially and manual steering of the vehicle occurs.

Figure 2:
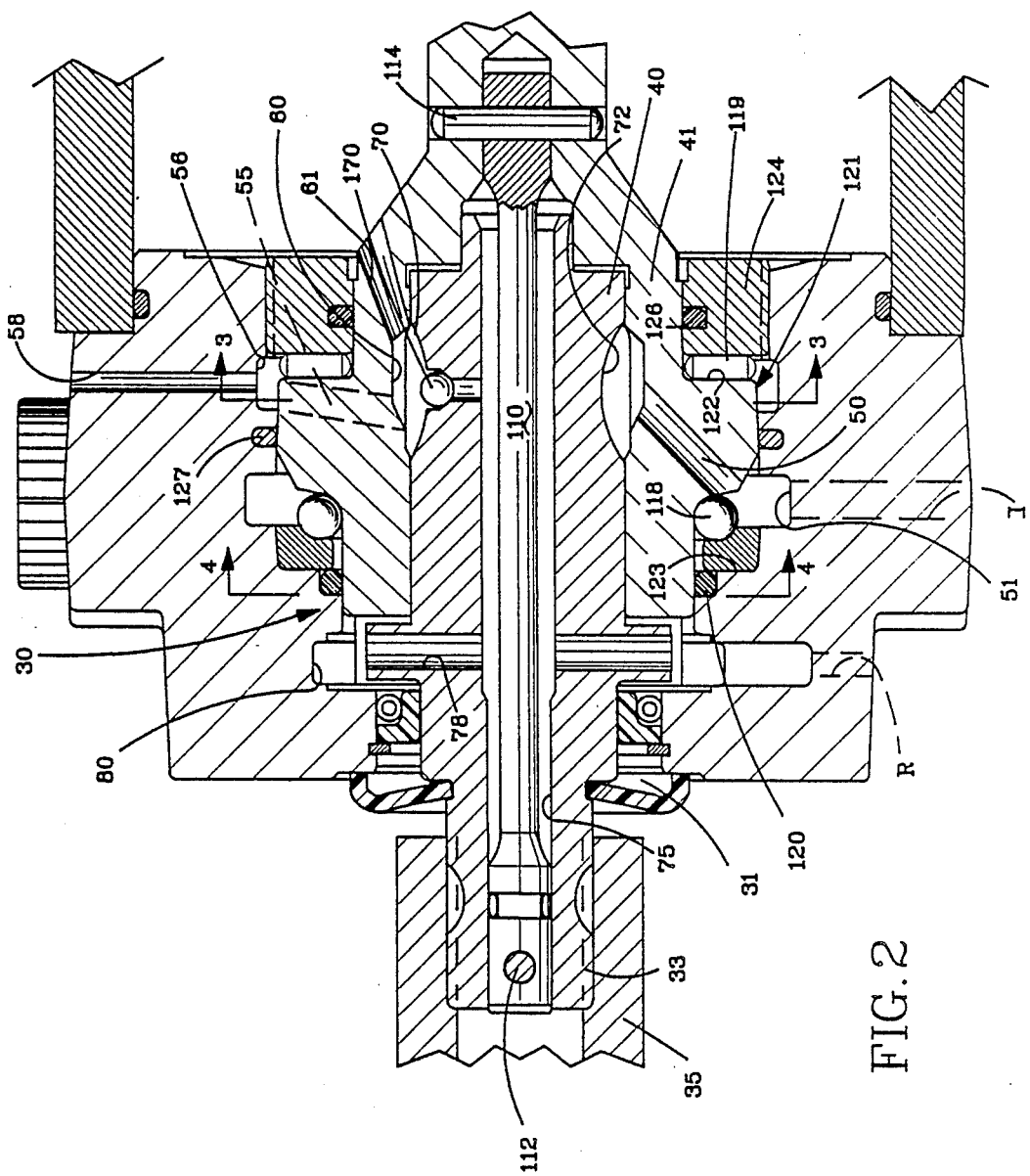
FIG. 2 is an enlarged view of a portion of the steering gear of FIG. 1.

When manual steering of the vehicle occurs, it is necessary to circulate the fluid between the chamber portions 16 and 18 depending on the direction of steering. This is accomplished by a circulation fluid path which includes a ball check valve 170 (FIGS. 2 and 3). The ball check valve 170 is located in one of the passages 74 in the valve core part 40. The ball check valve 170 is normally maintained against a seat 172 under the influence of fluid pressure in the inlet passage 50. In the event that there is a loss of fluid pressure, the ball check valve 170 is then free to move off of the seat 172.

If the piston 14 is manually moved axially to the right, as viewed in FIG. 1., by rotating the input shaft 31 and valve core part 40 counterclockwise relative to the valve sleeve part, 41, as viewed in FIG. 3, the chamber portion 16 expands and the chamber portion 18 contracts. Thus, fluid is forced out of chamber portion 18 through the passage 58, annulus 56, passages 55, the grooves 54, grooves 72, passages 74, and into internal passage 75. That fluid will cause the ball check valve 170 to move vertically upward, as viewed in FIG. 3, away from the seat 172 to permit fluid flow past the ball check valve into the adjacent groove 60, passage 61 and the chamber portion 16.

If the piston moves axially to the left, as viewed in FIG. 1, by rotating the input shaft 31 and valve core part 40 clockwise relative to the valve sleeve part 41, as viewed in FIG. 3, the fluid is forced out of the chamber portion 16 through passages 61, the grooves 60, the grooves 72, passages 74, and the internal passage 75 of the valve core part 40. This will cause the ball check valve 170 to move vertically upward, as viewed in FIG. 3, away from the seat 172 which will cause the fluid to then flow past the ball check valve into the adjacent groove 70, groove 54, passage 55, annulus 56 and into passage 58 which communicates with the chamber portion 18.

From the above it should be clear that the present invention provides an improved pressurized fluid operated servo mechanism. Further, it should be clear to one skilled in the art that certain modifications, changes and improvements of the present invention may be made. Such modifications, changes and improvements are intended to be covered by the appended claims.

What is claimed is:

1. An apparatus comprising:

a fluid motor including a housing defining a chamber and a movable piston located in said chamber and dividing said chamber into first and second portions, said housing being adapted to be connected in fluid communication with a source of high pressure fluid and a reservoir which receives fluid at a relatively low pressure from said fluid motor upon movement of said piston in said chamber, a one-piece rotatable combined valve part and followup member connected with said piston, said one-piece valve part and follow-up member including an externally threaded portion connected with said piston and a hollow valve portion which is closed at one end, said hollow valve portion including a first surface area which is continuously exposed to the low fluid pressure conducted to reservoir, said first surface area being partially disposed on an end of said one-piece valve part and follow-up member and being partially disposed within said hollow valve portion, said hollow valve portion of said one-piece valve part and follow-up member including a radially outwardly projecting annular flange disposed between opposite end portions of said hollow valve portion, said annular flange having a second surface area which is of the same size as said first surface area and which is continuously exposed to the relatively high fluid pressure conducted from the source of high pressure fluid, said hollow valve portion of said one-piece valve part and follow-up member including a third surface area which is of the same size as said first surface area and is disposed on a side of said flange opposite from said second surface area, said third surface area being exposed to the fluid pressure in said first chamber portion of said fluid motor, said one-piece valve part and follow-up member including a fourth surface area which is partially disposed on said hollow valve portion and is partially disposed on said externally threaded portion of said one-piece valve part and follow-up member, said fourth surface area being of the same size as said first surface area, said fourth surface area being exposed to the fluid pressure in said second chamber portion of said fluid motor, a rotatable valve core disposed in said hollow valve portion of said one-piece valve port and follow-up member at a location radially inwardly of said flange, said valve core being rotatable relative to said hollow valve portion between an initial condition and first and second actuated conditions, a torsion bar extending axially along said one-piece valve part and follow-up member and having a first end portion connected to said one-piece valve part and follow-up member adjacent to the closed end of said hollow valve portion and having a second end portion connected to said rotatable valve core, said torsion bar having a central portion which is at least partially disposed radially inwardly of said flange, said torsion bar being resiliently deflected by movement of said valve core from the initial condition toward either of said actuated conditions, said valve core cooperating with said hollow valve portion to communicate relatively high fluid pressure from the source of fluid pressure to said second chamber portion of said fluid motor and said fourth surface area and to communicate the relatively low fluid pressure at the reservoir to said first chamber portion of said fluid motor and said third surface area when said valve core is in the first actuated condition, said one-piece valve part and follow-up member being pressure balanced when said valve core is in the first actuated condition by the relatively high fluid pressure on said second surface area being offset by the relatively high fluid pressure on said fourth surface area and by the relatively low fluid pressure on said first surface area being offset by the relatively low fluid pressure on said third surface area, said valve core cooperating with said hollow valve portion to communicate relatively high fluid pressure from the source of fluid pressure to said first chamber portion of said fluid motor and said third surface area and to communicate the relatively low fluid pressure at the reservoir to said second chamber portion of said fluid motor and said fourth surface area when said valve core is in the second actuated condition, said one-piece valve part and follow-up member being pressure balanced when said valve core is in the second actuated condition by the relatively high fluid pressure on said second surface area being offset by the relatively high fluid pressure on said third surface area and by the relatively low fluid pressure on said first surface area being offset by the relatively low fluid pressure on said fourth surface area.

2. An apparatus as set forth in claim 1 wherein a first portion of said first surface area is disposed on an end of said hollow valve portion adjacent to a first end of said core, a second portion of said first surface area being disposed in said hollow valve portion adjacent to a second end of said core.

3. An apparatus as set forth in claim 2 wherein said second and third surface areas are disposed along a central axis of said one-piece valve part and follow-up member at locations between said first and second portions of said first surface area.

4. An apparatus as set forth in claim 1 wherein said flange is located radially outwardly of said valve core and has an axial extent which is less than the axial extent of said valve core.

* * * * *